US007765987B2

(12) United States Patent
Steinbauer et al.

(10) Patent No.: US 7,765,987 B2
(45) Date of Patent: Aug. 3, 2010

(54) APPARATUS FOR ACTUATING AT LEAST ONE PIEZOELECTRIC ACTUATING DRIVE OF AN INJECTION NOZZLE FOR AN INTERNAL COMBUSTION ENGINE

(75) Inventors: Herbert Steinbauer, Altenberg (AT); Hubert Eder, Kirchberg/Thening (AT)

(73) Assignee: Steinbauer Electronics Development GmbH, Enns (AT)

( * ) Notice: Subject to any disclaimer, the term of this patent is extended or adjusted under 35 U.S.C. 154(b) by 92 days.

(21) Appl. No.: 12/227,069

(22) PCT Filed: May 22, 2007

(86) PCT No.: PCT/AT2007/000243

§ 371 (c)(1),
(2), (4) Date: Nov. 6, 2008

(87) PCT Pub. No.: WO2007/134353

PCT Pub. Date: Nov. 29, 2007

(65) Prior Publication Data

US 2009/0159052 A1    Jun. 25, 2009

(30) Foreign Application Priority Data

May 24, 2006 (AT) .............................. A 901/2006

(51) Int. Cl.
*F02M 51/00* (2006.01)
(52) U.S. Cl. .................. 123/490; 123/478; 123/480; 310/316.03; 310/317
(58) Field of Classification Search .................. 123/472, 123/478, 480, 490, 498; 310/316.03, 317, 310/323.06; 239/102.2; 701/101, 102
See application file for complete search history.

(56) References Cited

U.S. PATENT DOCUMENTS 4,733,106 A * 3/1988 Okutsu et al. ................ 327/111

(Continued)

FOREIGN PATENT DOCUMENTS

DE    10 2004 015 002    10/2005

(Continued)

OTHER PUBLICATIONS

International Search Report, Oct. 2007.

*Primary Examiner*—Hai H Huynh
*Assistant Examiner*—Anthony L Bacon
(74) *Attorney, Agent, or Firm*—Collard & Roe, P.C.

(57) ABSTRACT

An apparatus is described for actuating at least one piezoelectric actuating drive (1) of an injection nozzle for an internal combustion engine, comprising a control device (6) which cyclically actuates a charging circuit and a discharging circuit (2, 3) of the piezoelectric actuating drive (1). In order to enable a power-increasing actuation of the piezoelectric actuating drive (1) it is proposed that a capacitive equivalent load (9), which is connected to a charging stage (13) and electrically simulates the piezoelectric actuating drive (1), and an additional discharging stage (7) for piezoelectric actuating drive (1) and a changeover switch (8) which can be actuated by a control circuit (11) are provided, which switch connects the equivalent load (9) or the piezoelectric actuating drive (1) to the discharging circuit (3) which is controlled via the control device (6), and that after it has been decoupled from the discharging circuit (3) the piezoelectric actuating drive (1) can be discharged with a delay, via the additional discharging stage (7) which can be actuated by the control circuit (11), depending on at least one parameter which changes with the loading of the internal combustion engine.

2 Claims, 3 Drawing Sheets

U.S. PATENT DOCUMENTS

| | | | |
|---|---|---|---|
| 4,767,959 A * | 8/1988 | Sakakibara et al. | 310/317 |
| 6,147,433 A * | 11/2000 | Reineke et al. | 310/316.03 |
| 6,320,297 B1 * | 11/2001 | Gurich et al. | 310/316.03 |
| 6,435,162 B1 | 8/2002 | Lingl et al. | |
| 2003/0164160 A1 * | 9/2003 | Schrod | 123/490 |
| 2007/0137620 A1 * | 6/2007 | Couch | 123/490 |

FOREIGN PATENT DOCUMENTS

| | | |
|---|---|---|
| DE | 10 2004 040 073 | 3/2006 |
| EP | 1 085 190 | 3/2001 |
| WO | WO 2006/032543 | 3/2006 |

\* cited by examiner

APPARATUS FOR ACTUATING AT LEAST ONE PIEZOELECTRIC ACTUATING DRIVE OF AN INJECTION NOZZLE FOR AN INTERNAL COMBUSTION ENGINE

CROSS REFERENCE TO RELATED APPLICATIONS

This application is the National Stage of PCT/AT2007/000243 filed on May 22, 2007, which claims priority under 35 U.S.C. §119 of Austrian Application No. A 901/2006 filed on May 24, 2006. The international application under PCT article 21(2) was not published in English.

1. FIELD OF THE INVENTION

The invention relates to an apparatus for actuating at least one piezoelectric actuating drive of an injection nozzle for an internal combustion engine, comprising a control device which cyclically actuates a charging circuit and a discharging circuit of the piezoelectric actuating drive.

2. DESCRIPTION OF THE PRIOR ART

Injection nozzles for internal combustion engines with piezoelectric actuating drives for actuating the jet needles are characterized by very short switching times, so that the fuel quantities injected into the combustion chamber can be controlled on the basis of program depending on the load of the internal combustion engine. For this purpose, the piezoelectric elements of the actuating drives, which elements are arranged behind one another in the manner of a stack, are charged via a charging circuit and discharged via a discharging circuit, leading to an opening and closing of the injection nozzles. The time sequence of the charging and discharging process is ensured with the help of a control device which triggers the charging and discharging process accordingly, which usually occurs depending on the saved characteristic maps for the respective loads of the internal combustion engine, so that the control program determines the fuel quantity injected into the combustion chamber through the opening times of the injection nozzles and thus also the power of the internal combustion engine to a certain extent. In order to increase the injected fuel quantity for increasing power in a dependent manner, the opening times of the injection nozzles would have to be extended accordingly, thus requiring a massive intervention in the control program of the control device for charging and discharging the piezoelectric actuating drives.

SUMMARY OF THE INVENTION

The invention is thus based on the object of providing an apparatus of the kind mentioned above for actuating at least one piezoelectric actuating drive of an injection nozzle for an internal combustion engine in such a way that an increase in power for the internal combustion engine can be achieved with comparatively simple means without having to intervene in the control program of the control device for charging and discharging the piezoelectric actuating drives.

This object is achieved by the invention in such a way that a capacitive equivalent load, which is connected to a charging stage and electrically simulates the piezoelectric actuating drive, and additional discharging stage for piezoelectric actuating drive and a changeover switch which can be actuated by a control circuit are provided, which switch connects the equivalent load or the piezoelectric actuating drive to the discharging circuit which is controlled via the control device, and that after it has been decoupled from the discharging circuit the piezoelectric actuating drive can be discharged with a delay, via the additional discharging stage which can be actuated by the control circuit, depending on at least one parameter which changes with the loading of the internal combustion engine.

Since as a result of this measure in the case of a power-increasing extension of the opening intervals of the injection nozzles the provided control device for the piezoelectric actuating drives of the injection nozzles are switched over to capacitive equivalent loads which electrically simulate said piezoelectric actuating drives, the equivalent loads can be discharged by the control device instead of the piezoelectric actuating drives, so that input variables are obtained for the control device as would be present without any increase in power. It is therefore not necessary to intervene in the control sequence of the control device. The actuation of the piezoelectric actuating drives for power-increasing extension of the opening intervals of the injection nozzles occurs via a separate control circuit which, when necessary, not only switches over the discharging circuit controlled by the control device for the respective piezoelectric actuating drive with the help of a changeover switch to the charged equivalent load, but also connects the piezoelectric actuating drive to an additional discharging stage in order to discharge the same in a delayed manner and to thus ensure a respective extension of the injection interval of the injection nozzle. The extension time depends on parameters changing with the loading of the internal combustion engine, as is known per se in power-increasing extensions of the injection interval. The control circuit is used to actuate the additional discharging stages for the piezoelectric actuating drives based on a program depending on such parameters on which a respective power increase is made dependent and which trigger the control circuit. The charging of the piezoelectric actuating drives after its discharge occurs principally via the charging circuit actuated by the control device. The charging of the equivalent loads is usually made via a separate charging stage, which is not mandatory however.

In order to ensure that the equivalent loads are connected via the changeover switch with the discharging circuit before the actuation of the discharging circuit by the control device, the control circuit can actuate the changeover switch depending on the voltage characteristic of a preceding actuation cycle. It can be assumed that in directly successive actuation cycles there are no substantial changes concerning the voltage characteristics, so that on the basis of the voltage characteristic of a preceding actuation cycle it is possible to ensure a timely changeover of the discharging circuit which is actuated by the control device to the equivalent load.

BRIEF DESCRIPTION OF THE DRAWINGS

The subject matter of the invention is shown by way of example in the drawings, wherein.

DESCRIPTION OF THE PREFERRED EMBODIMENTS

Figure 1:
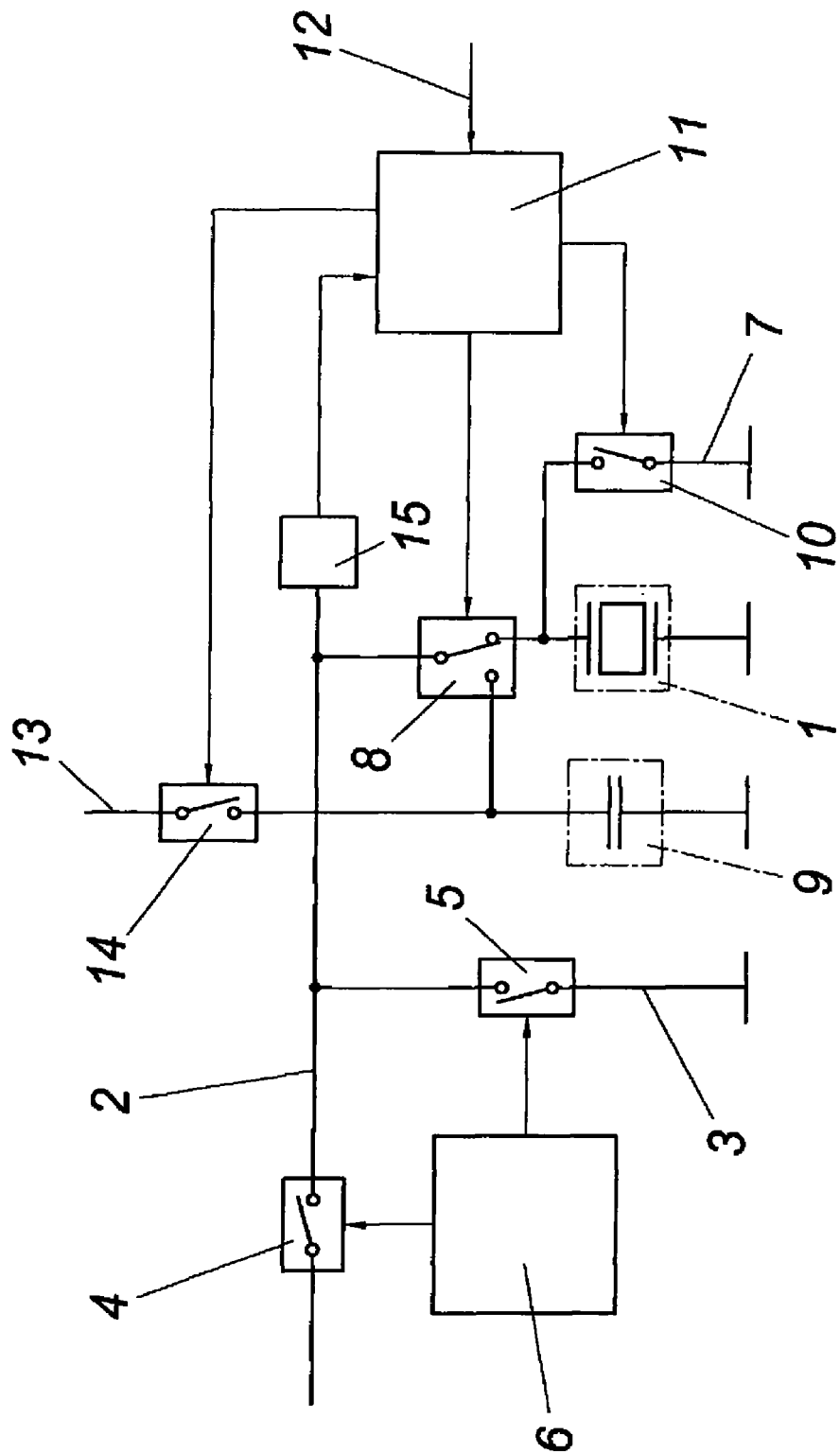
FIG. 1 shows an apparatus in accordance with the invention for actuating at least one piezoelectric actuating drive of an injection nozzle for an internal combustion engine in a schematic block diagram.
Figure 3:
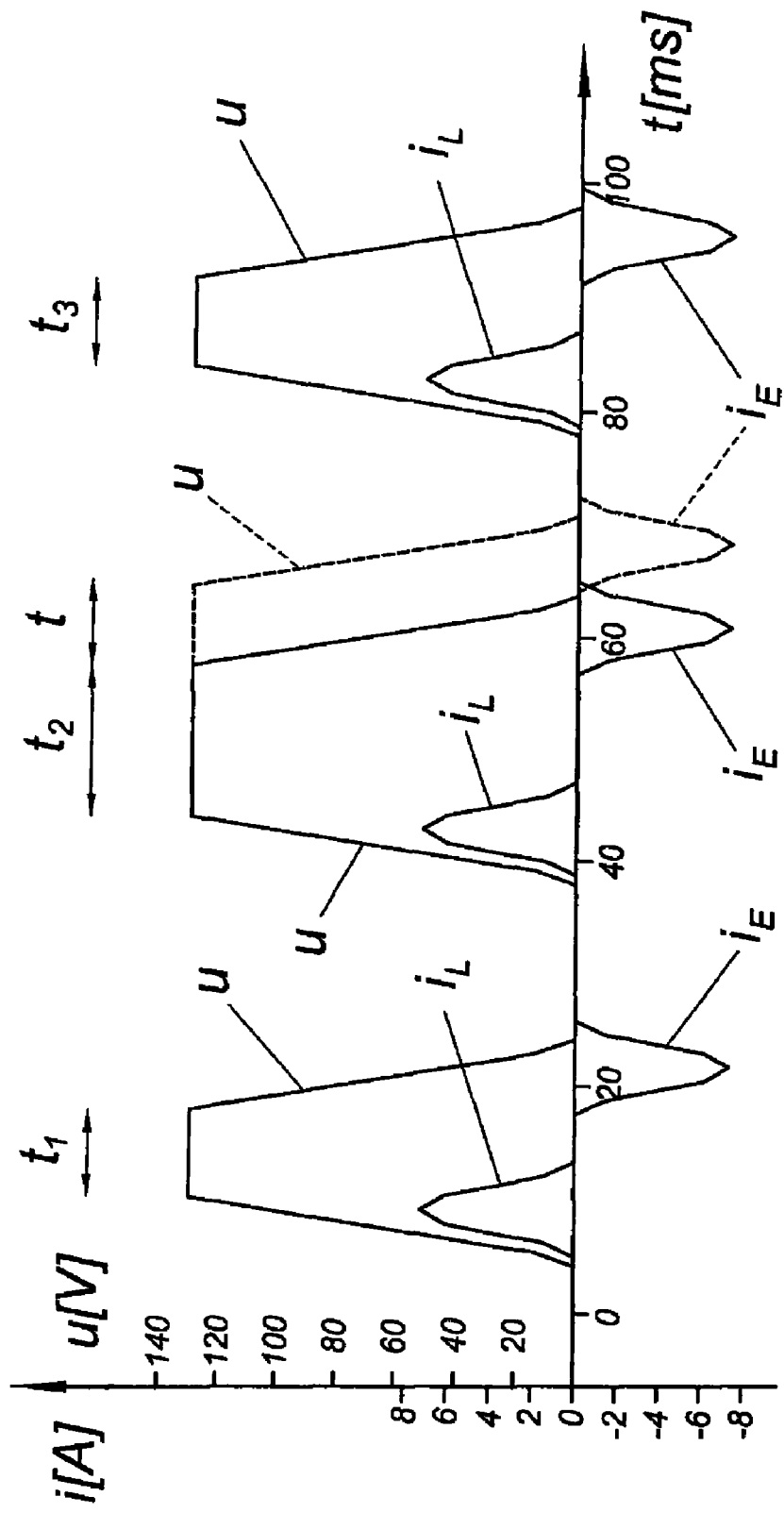
FIG. 3 shows the voltage and current progression during an actuating cycle of a piezoelectric actuating drive.

According to FIG. 1, the piezoelectric actuating drive 1 for an injection nozzle of an internal combustion engine is charged via a charging circuit 2 and discharged through a discharging circuit 3, with the charging circuit 2 and the discharging circuit 3 being actuated via control switch 4, 5 by a control device 6. The injection nozzle is opened with the charging of the piezoelectric actuating drive 1 by closing the control switch 4 and it is kept open until the piezoelectric actuating drive 1 is discharged via discharging circuit 3 by actuating the pertinent control switch 5. As is shown in FIG. 3, a voltage u builds up in the piezoelectric actuating drive 1 during the charging, which drops again upon discharging. Accordingly, a charging current $i_L$ flows via the charging circuit 2 during the build-up of the voltage u on the piezoelectric drive 1 and a discharging current $i_E$ which flows in the opposite direction to charging current $i_L$ during the voltage drop. In the illustrated injection interval of an injection nozzle, a pilot injection is obtained during the interval $t_1$, a main injection during interval $t_2$ and an after-injection of fuel during an interval $t_3$. If power is to be increased when necessary, the interval $t_2$ for the main injection is increased by an interval t, which requires a time-delayed discharge of the piezoelectric actuating drive 1, as can be seen from the progression of voltage u on the piezoelectric drive 1, as has been added by hand with the broken line.

In order to ensure such an extension of the main injection by interval t, the control device 6 is not reprogrammed concerning the actuation of the control switch 5 for the discharging circuit 3, but instead the piezoelectric actuating drive 1 is discharged via a separate discharging stage 7. For this purpose, a changeover switch 8 is provided which switches the discharging circuit 3 from the piezoelectric actuating drive 1 to a capacitive equivalent load 9 which electrically simulates the piezoelectric actuating drive 1, so that after the changeover of the changeover switch 8 it is not the discharging actuating drive 1 which is discharged but the equivalent load 9 via the discharging circuit 3 without having to intervene in the control of the discharging circuit 3 by the control device 6. The discharging current $i_E$ of the equivalent load 9 flowing via the discharging circuit 3 corresponds to the discharging current of the piezoelectric actuating drive 1.

The piezoelectric actuating drive 1 is discharged delayed by interval t via the discharging stage 7 in comparison with its actuation via the control device 6, such that the control switch 10 of said discharging stage 7 is actuated by an additional control circuit 11 which is supplied with selected parameters changing with the loading of the internal combustion engine such as the speed of the internal combustion engine, the accelerator pedal position and the boost pressure. The actuation of the control circuit 11 with at least one of these parameters is indicated by the input arrow 12. Based on the control program underlying the control circuit 11, it is determined depending on the applied parameters whether a power increase is to be made. If this is the case, the changeover switch 8 is triggered by the control circuit 11 after the charging of the piezoelectric actuating drive 1 via the charging circuit 2, so that the control device 6 is made to believe that there is a proper discharging of the piezoelectric actuating drive 1 by a discharging of the equivalent load 9 while the discharging of the piezoelectric actuating drive 1 is made in a time-delayed manner via the additional discharging stage 7. After the discharging of the piezoelectric actuating drive 1 via the discharging stage 7, the changeover switch 8 needs to be changed over again by the control circuit 11 in order to ensure the charging of the piezoelectric actuating drive 1 via the charging circuit 2 actuated by the control device 6. After the discharging of the equivalent load 9, it needs to be charged again, which is achieved through a charging stage 12, whose control switch 14 is triggered by the control circuit 11.

In order to prevent that an actuation of the changeover switch 8 occurs after the triggering of the control switch 5 for the discharging circuit 3, a detector 15 is provided for the voltage u applied to the piezoelectric actuating drive 1 and the equivalent load 9. Since the control circuit 11 is connected with said detector 15, the voltage curve of the respective actuation cycles can be monitored via the control circuit 11 and it is possible to estimate interval $t_2$ on the basis of a pre-ceding actuation cycle in order to enable making the changeover of the changeover switch 8 within said interval $t_2$.

Figure 2:
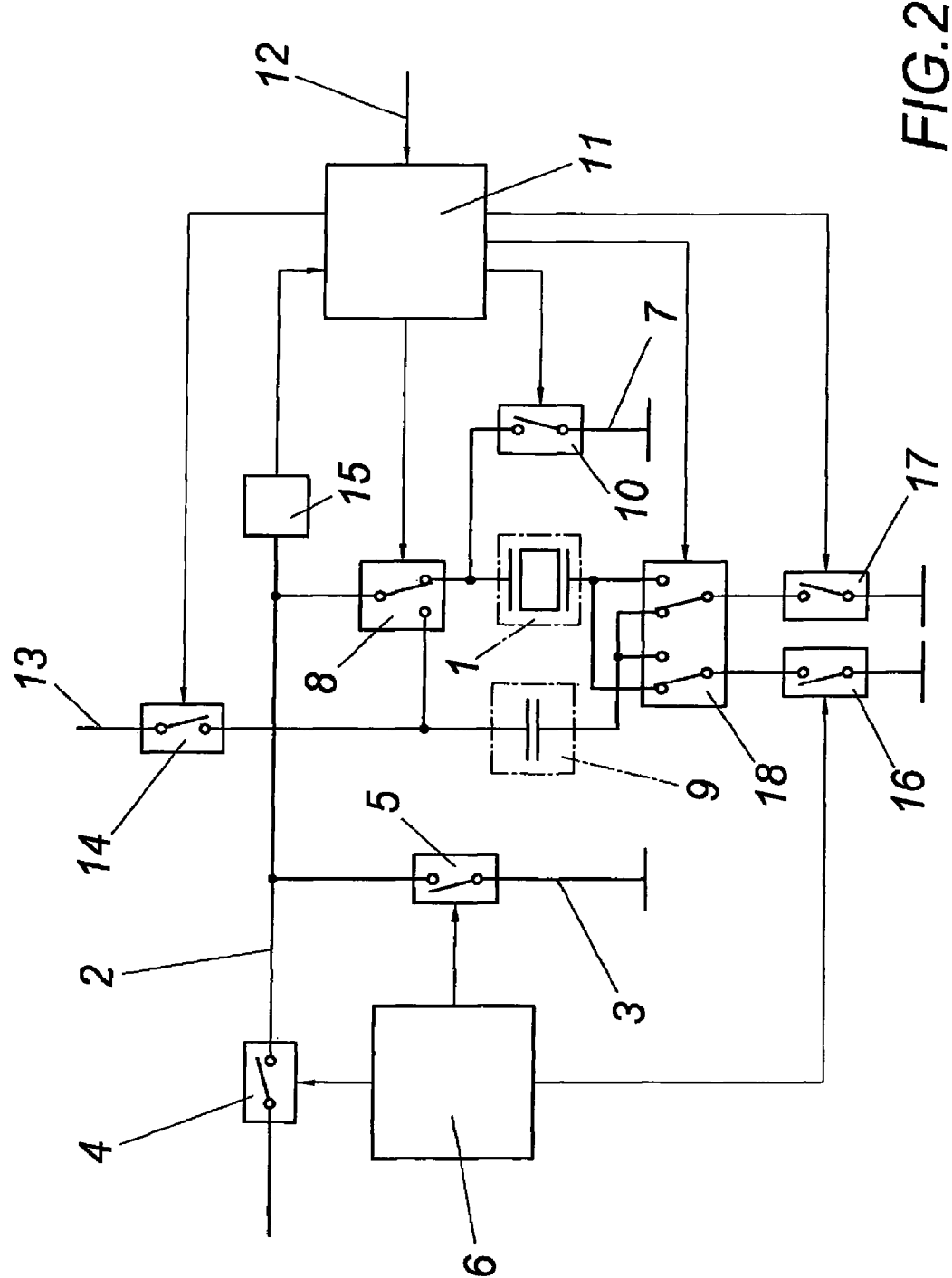
FIG. 2 shows an illustration corresponding to FIG. 1 of an embodiment of an apparatus in accordance with the invention.

In many cases, the individual piezoelectric actuating drives 1 are each selected by the control device 6 via the individual control switches 16, as is shown in FIG. 2. In such a case, the equivalent load 9 must also be provided with a respective control switch 17, so that the input variables for the control device 6 will remain the same after the changeover of the discharging circuit from the respective piezoelectric actuating drive 1 to the pertinent equivalent load. This means that a respective changeover device 18 also needs to be provided for the control switch 16 and 17, which changeover device needs to be actuated via the control circuit 11 together with the changeover switch 8. In all other respects, the function of the apparatus does not change concerning the charging of the piezoelectric actuating drive 1 via the charging circuit 2 and the discharging optionally via the discharging circuit 3 or the discharging stage 7.

The invention claimed is:

1. An apparatus for actuating at least one piezoelectric actuating drive of an injection nozzle for an internal combustion engine, comprising a control device which cyclically actuates a charging circuit and a discharging circuit of the piezoelectric actuating drive, wherein a capacitive equivalent load (9), which is connected to a charging stage (13) and electrically simulates the piezoelectric actuating drive (1), and an additional discharging stage (7) for piezoelectric actuating drive (1) and a changeover switch (8) which can be actuated by a control circuit (11) are provided, which switch connects the equivalent load (9) or the piezoelectric actuating drive (1) to the discharging circuit (3) which is controlled via the control device (6), and that after it has been decoupled from the discharging circuit (3) the piezoelectric actuating drive (1) can be discharged with a delay, via the additional discharging stage (7) which can be actuated by the control circuit (11), depending on at least one parameter which changes with the loading of the internal combustion engine.

2. An apparatus according to claim 1, wherein the control circuit (11) actuates the changeover switch (8) depending on the voltage curve of a preceding actuating cycle.

* * * * *